US009740309B2

(12) United States Patent
Wang

(10) Patent No.: US 9,740,309 B2
(45) Date of Patent: Aug. 22, 2017

(54) FINGER-DRIVEN COMPUTER MOUSE

(71) Applicant: David Y. Wang, Mesa, AZ (US)

(72) Inventor: David Y. Wang, Mesa, AZ (US)

( * ) Notice: Subject to any disclaimer, the term of this patent is extended or adjusted under 35 U.S.C. 154(b) by 0 days.

(21) Appl. No.: 14/831,817

(22) Filed: Aug. 20, 2015

(65) Prior Publication Data

US 2015/0363010 A1 Dec. 17, 2015

Related U.S. Application Data

(63) Continuation-in-part of application No. 13/210,209, filed on Aug. 15, 2011, now abandoned.

(51) Int. Cl.
*G06F 3/0354* (2013.01)
(52) U.S. Cl.
CPC ................................ *G06F 3/03543* (2013.01)
(58) Field of Classification Search
CPC .................................................... G06F 3/03543
See application file for complete search history.

(56) References Cited

U.S. PATENT DOCUMENTS

| D302,426 | S | | 7/1989 | Bradley | |
|---|---|---|---|---|---|
| 4,862,165 | A | | 8/1989 | Gart | |
| 4,913,573 | A | * | 4/1990 | Retter | B41J 5/10 |
| | | | | | 345/163 |
| 4,917,516 | A | * | 4/1990 | Retter | G06F 3/03543 |
| | | | | | 345/163 |
| D328,597 | S | | 8/1992 | Clouss | |
| 5,157,381 | A | | 10/1992 | Cheng | |
| D344,498 | S | * | 2/1994 | Leman | D14/402 |
| 5,298,919 | A | | 3/1994 | Chang | |
| 5,313,230 | A | | 5/1994 | Venolia et al. | |
| 5,576,733 | A | | 11/1996 | Lo | |
| 5,578,817 | A | * | 11/1996 | Bidiville | G06F 3/0312 |
| | | | | | 250/221 |
| 5,865,404 | A | * | 2/1999 | Hesley | G06F 3/039 |
| | | | | | 248/118 |
| 5,865,405 | A | * | 2/1999 | Hesley | B68G 5/00 |
| | | | | | 248/118 |
| 5,868,365 | A | * | 2/1999 | Hesley | G06F 3/03543 |
| | | | | | 248/118 |
| D410,638 | S | * | 6/1999 | Sheehan | D14/409 |
| 5,990,870 | A | * | 11/1999 | Chen | G06F 3/03543 |
| | | | | | 345/156 |
| D432,131 | S | * | 10/2000 | Jones | D14/402 |
| D434,038 | S | * | 11/2000 | Ho | D14/402 |
| D439,253 | S | * | 3/2001 | Sheehan | D14/402 |

(Continued)

FOREIGN PATENT DOCUMENTS

DE 9216634 U1 * 2/1993 ......... G06F 3/03543

*Primary Examiner* — Joseph Haley
*Assistant Examiner* — Karin Kiyabu
(74) *Attorney, Agent, or Firm* — Schmeiser, Olsen & Watts, LLP

(57) ABSTRACT

The present invention relates to a finger-driven computer mouse. The finger-driven computer mouse includes a mouse housing and finger retention device adjacent thereto. The user inserts his or her finger tips in the finger retention device and can position the mouse across a flat surface by actions of the fingers except the thumb which is used to operate mouse buttons arranged on a side surface. The finger-driven mouse allows the wrist and hand muscles to be in a relaxed, natural posture.

5 Claims, 3 Drawing Sheets

(56) References Cited

U.S. PATENT DOCUMENTS

| | | | |
|---|---|---|---|
| D440,971 S * | 4/2001 | Gombert | D14/402 |
| D441,752 S * | 5/2001 | Lee | D14/402 |
| D442,595 S * | 5/2001 | Lee | D14/402 |
| D442,958 S * | 5/2001 | Funakoshi | D14/402 |
| 6,256,013 B1 * | 7/2001 | Siddiqui | G06F 3/0312 341/20 |
| 6,256,015 B1 | 7/2001 | Adler | |
| 6,362,811 B1 * | 3/2002 | Edwards | G06F 3/03543 248/118.1 |
| 6,377,245 B1 * | 4/2002 | Park | G06F 3/03543 345/163 |
| D457,884 S * | 5/2002 | Roberts | D14/402 |
| 6,396,478 B1 * | 5/2002 | Kravtin | G06F 3/03543 248/118.1 |
| 6,417,843 B1 * | 7/2002 | Stephens | G06F 3/03543 248/118.1 |
| 6,482,168 B1 * | 11/2002 | Betcher | A61F 5/0118 128/878 |
| 6,489,947 B2 * | 12/2002 | Hesley | G06F 3/039 248/118 |
| 6,525,713 B1 * | 2/2003 | Soeta | G06F 3/03543 345/159 |
| D473,232 S * | 4/2003 | Fisher | D14/402 |
| 6,556,150 B1 * | 4/2003 | McLoone | G06F 3/03549 341/20 |
| D485,272 S * | 1/2004 | Fisher | D14/402 |
| D489,724 S * | 5/2004 | Fisher | D14/402 |
| D491,948 S * | 6/2004 | Fisher | D14/402 |
| D501,861 S * | 2/2005 | Peter | D14/408 |
| D509,828 S | 9/2005 | Wang | |
| 6,940,488 B1 | 9/2005 | Siddiqui et al. | |
| 7,098,893 B2 * | 8/2006 | Rogers | G06F 3/03543 345/157 |
| D537,823 S * | 3/2007 | Chatterjee | D14/402 |
| D538,284 S * | 3/2007 | Chatterjee | D14/402 |
| D539,800 S * | 4/2007 | Chatterjee | D14/402 |
| D540,322 S * | 4/2007 | Fisher | D14/402 |
| D540,323 S * | 4/2007 | Fisher | D14/402 |
| D540,324 S * | 4/2007 | Fisher | D14/402 |
| 7,202,851 B2 * | 4/2007 | Cunningham | G06F 3/016 345/156 |
| D564,515 S * | 3/2008 | Chatterjee | D14/402 |
| D564,516 S * | 3/2008 | Chatterjee | D14/402 |
| D570,842 S * | 6/2008 | Chatterjee | D14/402 |
| D574,379 S * | 8/2008 | Manalo | D14/402 |
| D583,376 S * | 12/2008 | Snijders | D14/405 |
| D591,293 S * | 4/2009 | Manalo | D14/402 |
| D591,294 S * | 4/2009 | Manalo | D14/402 |
| D591,295 S * | 4/2009 | Manalo | D14/402 |
| D591,296 S * | 4/2009 | Manalo | D14/402 |
| D591,297 S * | 4/2009 | Manalo | D14/402 |
| D594,458 S * | 6/2009 | Manalo | D14/402 |
| D594,459 S * | 6/2009 | Manalo | D14/402 |
| D607,452 S * | 1/2010 | Manalo | D14/402 |
| 7,675,505 B1 * | 3/2010 | Gehrking | G06F 3/03543 345/156 |
| 7,757,998 B1 * | 7/2010 | Fidali | G06F 3/03543 248/118 |
| 7,777,723 B2 * | 8/2010 | Namiki | G06F 3/03543 248/118 |
| D627,355 S * | 11/2010 | Blanchard | D14/402 |
| 7,834,851 B1 * | 11/2010 | Fidali | G06F 3/03543 248/118 |
| 7,948,472 B2 * | 5/2011 | Namiki | G06F 3/03543 248/118 |
| 8,022,930 B2 * | 9/2011 | Odell | G06F 3/03543 345/156 |
| 8,098,229 B2 * | 1/2012 | Snijders | G06F 3/03543 345/156 |
| D717,877 S * | 11/2014 | Cerone | D21/333 |
| 2001/0052894 A1 * | 12/2001 | Segalle | G06F 3/03543 345/163 |
| 2002/0084985 A1 * | 7/2002 | Hesley | G06F 3/039 345/163 |
| 2002/0118174 A1 * | 8/2002 | Rodgers | G06F 3/03543 345/163 |
| 2003/0043117 A1 * | 3/2003 | Lantigua | G06F 3/03543 345/163 |
| 2003/0197680 A1 * | 10/2003 | Davenport | G06F 3/03543 345/163 |
| 2004/0212591 A1 * | 10/2004 | Snijders | G06F 3/03543 345/163 |
| 2005/0030285 A1 * | 2/2005 | Fu | G06F 3/03543 345/157 |
| 2005/0057507 A1 * | 3/2005 | Cheng | G06F 3/03543 345/163 |
| 2005/0083297 A1 * | 4/2005 | Duncan | A63F 13/06 345/156 |
| 2006/0007149 A1 * | 1/2006 | Miller | G06F 3/03543 345/163 |
| 2006/0007152 A1 | 1/2006 | Wang | |
| 2006/0125791 A1 * | 6/2006 | Lian | G06F 3/03543 345/163 |
| 2008/0055251 A1 * | 3/2008 | Yen | G06F 3/03543 345/163 |
| 2009/0289896 A1 * | 11/2009 | Jacob | G06F 1/1626 345/158 |
| 2009/0303183 A1 * | 12/2009 | Chen | G06F 3/03543 345/163 |
| 2011/0109552 A1 * | 5/2011 | Yasutake | G06F 3/03543 345/163 |

* cited by examiner

FINGER-DRIVEN COMPUTER MOUSE

CROSS-REFERENCE TO RELATED APPLICATIONS

This application is a continuation-in-part of Ser. No. 13/210,209 to David Y. Wang, filed Aug. 15, 2011, entitled "A FINGERS MANIPULATED ERGONOMIC COMPUTER MOUSE", the subject matter of which is incorporated herein by reference.

BACKGROUND OF THE INVENTION

1. Field of the Invention

The present invention relates to an finger-driven computer mouse.

2. Description of the Related Art

Pointing devices for use in computer systems include the "mouse" which is so-called because of its resemblance to an actual mouse. Conventional computer mice have a generally horizontal, primary supporting surface for supporting a hand in a horizontal position, as exemplified by the drawing figures of U.S. Pat. No. 5,157,381 to Cheng. These devices require using both a thumb and the other fingers of a hand to hold the edges of the mouse. Furthermore, the fore, middle, and ring fingers must be kept in constant tension to prevent them from resting too heavily on the buttons and depressing them inadvertently.

To avoid twisting the wrist when holding a computer mouse, an ergonomic computer mouse shown in U.S. Pat. No. 5,576,733 to Lo has chosen a bell-like shape. A hand holding the ergonomic computer mouse will be in a naturally upright and relaxed position. But this position does not take advantage the flexibility and mobility of fingers and their joints.

Most existing computer mice, including those disclosed in U.S. Pat. No. 6,256,015 and U.S. Pat. Application No. 2006/0033714, need the help of the thumb to be held and manipulated. Because of the inflexibility and limited mobility of the thumb, the wrist and its surrounding muscles have to be used to manipulate the mouse. This will cause fatigue for the wrist and the muscles surrounding it.

Furthermore, most existing computer mice have buttons on the top, facing upward. The fingers used to press the buttons may not rest on the buttons completely because of the worry of an unwanted button actuation. So, the muscles on the back of the hand have to be used to put the fingers up in the air most of the time. That further causes fatigue and sometimes even damage to the muscles on the back of the hand and around the wrist.

SUMMARY OF THE INVENTION

One aspect of the disclosure relates to a finger-driven computer mouse. In an embodiment, the finger-driven computer mouse comprises a computer mouse housing containing a plurality of computer mouse components, and a fingertip retention device disposed adjacent the computer mouse housing. The fingertip retention device receives each of a plurality of a user's fingers. In embodiment, the fingertip retention device includes a fingertip trench which may be formed as a gap between the mouse housing and the mouse housing extension. In this embodiment, the user inserts the fingertips into the trench. In another embodiment, the fingertip retention device includes a plurality of fingertip tubes. In still another embodiment, the fingertip retention device includes a plurality of adjustable fingertip straps.

In various embodiments, the finger-driven computer mouse further comprises a scroll wheel, and a plurality of mouse buttons disposed on a lateral side of the computer mouse housing, preferably including a left click mouse button and a right click mouse button, the mouse buttons reachable and operable by the user's thumb.

One object of the present invention relates to an finger-driven computer mouse which allows the mouse to be held and manipulated by the fingertips of the hand only without needing the help of the thumb. The human fingertips except the thumb are the most flexible and movable parts of the human body. Without the limitation of the thumb, the fingertips will have a greater range of movement, so manipulating the mouse will need less movement from the wrist and the muscles surrounding it. The computer mouse may be moved forward or backward by stretching out (outward) or curling (inward) the fingers, respectively. The computer mouse may be moved leftward or rightward by swinging the hand and/or forearm leftward or rightward accordingly.

Another object of the present invention relates to allowing the weight of the fingers, the thumb, and the palm heel of a hand to be put on surfaces all the time, either on the stationary surface on which the mouse is rested or on the mouse itself, whenever the mouse is held or manipulated. The buttons needed to generate the click signals for the computer are arranged around the lateral edge of the mouse transversely and will be pressed by the thumb resting on the stationary surface. Thus, the muscles of a hand are relaxed and no muscles on a user's hand are needed to lift any part of a hand up to the air at any time.

Another object of the present invention relates to a hand holding or manipulating the mouse be in the shape of a "loose fist." A hand in a loose fist shape is in a most natural and relaxed shape. And it also is the most convenient shape for the fingertips to either stretch out or curl in. So the mouse may be held or manipulated easily without causing tension on the muscle of the hand. This makes handling computer mouse more relaxing, and less stressful.

DETAILED DESCRIPTION OF THE INVENTION

Figure 1:
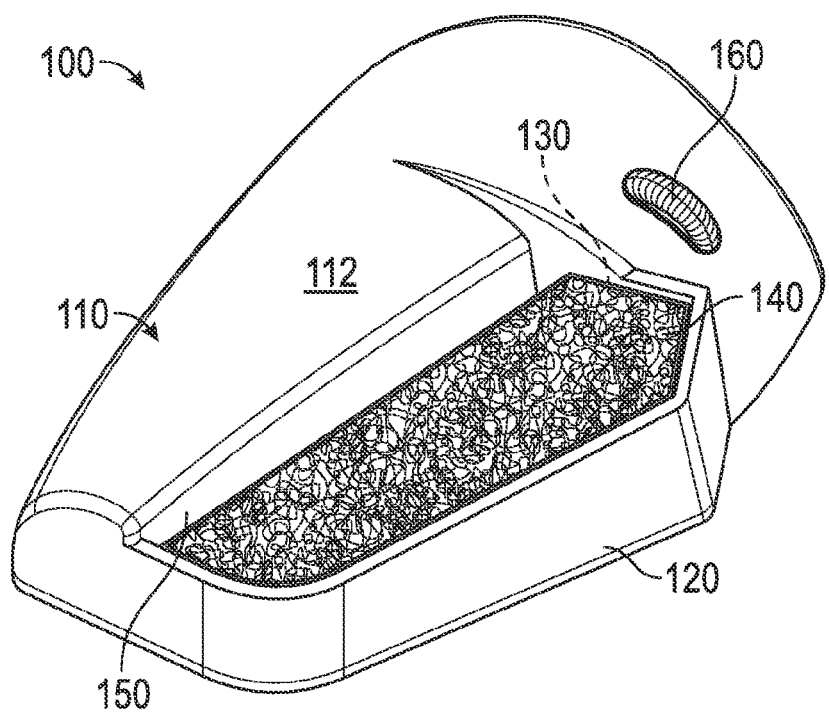
FIG. 1 illustrates a perspective view of a finger-driven computer mouse, according to a first embodiment.

FIG. 1 illustrates a perspective view of a finger-driven computer mouse 100, according to a first embodiment. As shown, the finger-driven computer mouse 100 includes a computer mouse housing 110, a mouse housing extension 120, a insert 140 and a fingertip trench 150. The computer mouse housing 110 encloses a plurality of computer mouse components 112. The finger-driven computer mouse 100 supports a wide variety of different types of computer mice, including mechanical mice that use a partially exposed ball that rolls along a flat surface and a sensor to detect movement of the ball relative to the surface, optical mice that use light-emitting diodes (LEDs) to determine movement relative to the surface, and laser mice that use laser light to detect movement. In general, a computer mouse translates motion of the mouse along a flat surface to X-Y coordinates on a computer screen. Reference may be found, for example, to U.S. Pat. No. 5,298,919 to Chang, U.S. Pat. No. 5,313,230 to Venolia et al., U.S. Pat. No. 6,940,488 to Siddiqui et al., and U.S. Pat. No. 7,009,598 to Bohn, which describe various types of commonly used computer mice, each incorporated herein by reference.

In the present embodiment, the mouse housing extension 120 may extend from a first side of the computer mouse housing 110. The fingertip trench 150 comprises a gap between the housing 110 and the insert 140 sloping downward to permit the user's fingertips to be comfortably placed therein. The fingertip trench has a planar floor, an upper trench perimeter defining a trench opening, and at least one side wall extending upwardly from the planar floor to the upper trench perimeter. The at least one side wall of the fingertip trench may be a curved side wall, and at least a portion of the upper trench perimeter may be curved. In one embodiment, the fingertip trench may comprise four side walls extending upwardly from the trench planar floor to the trench perimeter. The fingertip trench 150 may be a dimension (width and depth) to accommodate the size of the particular user's fingers. Additionally, the finger-driven computer mouse 100 may include a scroll wheel 160 that may be disposed on the mouse housing 110.

Figure 2:
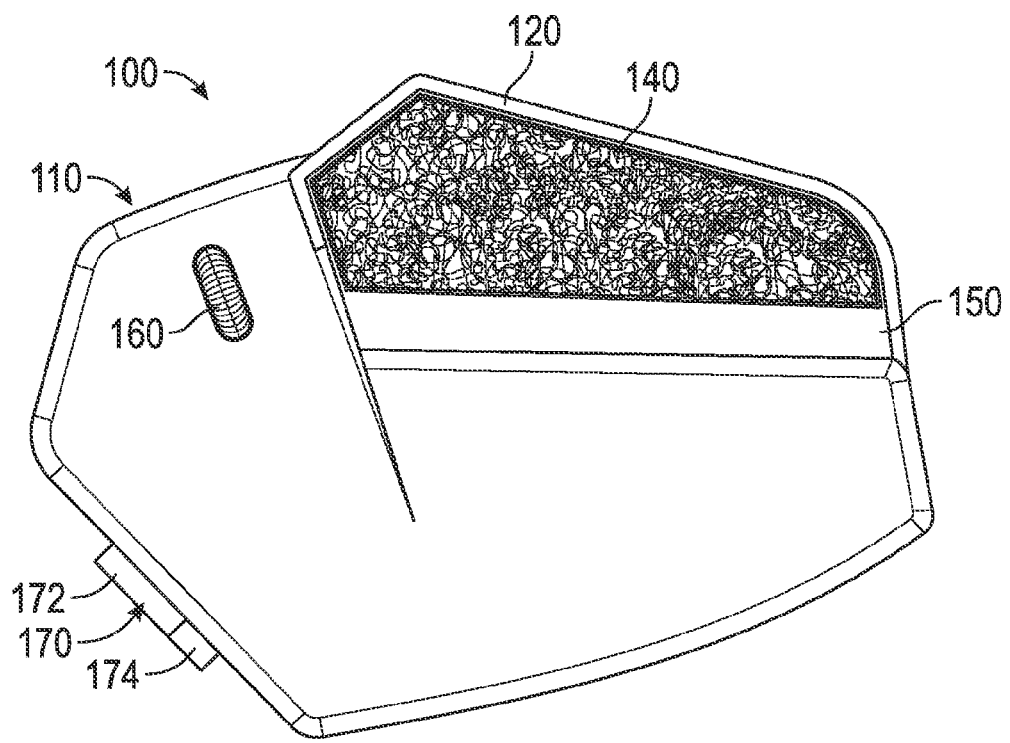
FIG. 2 illustrates a top view of the first finger-driven computer mouse.

FIG. 2 illustrates a top view of the finger-driven computer mouse 100. As shown in this view, the finger-driven computer mouse 100 may include a plurality of mouse buttons 170 disposed on a second side of the computer mouse housing 110. The mouse buttons 170 may include a left click mouse button 172 and a right click mouse button 174. The first finger-driven computer mouse 100 may be made of plastic, or metal or the like.

Figure 3:
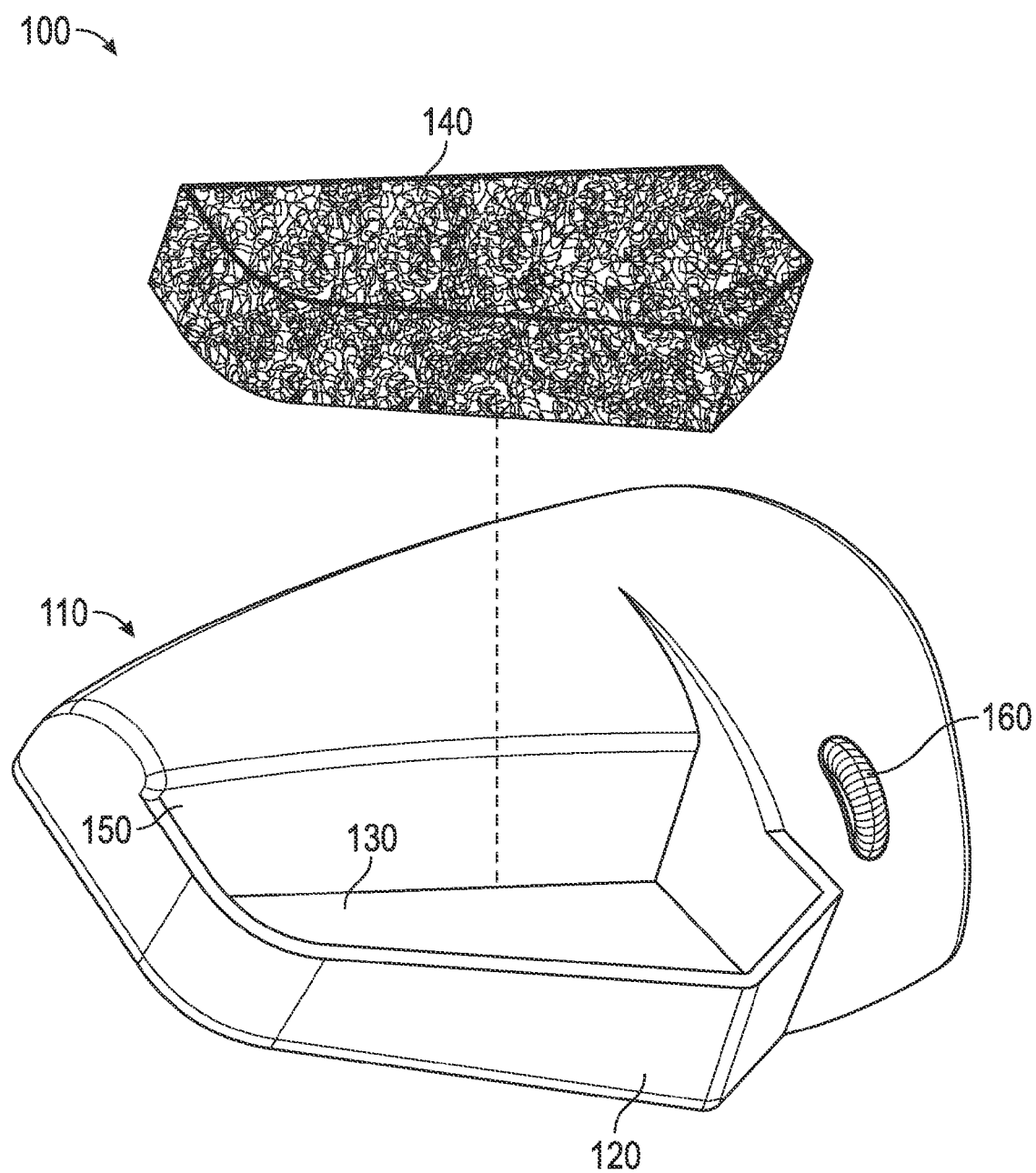
FIG. 3 illustrates an exploded top view of the first finger-driven computer mouse.

FIG. 3 illustrates an exploded top view of the first finger-driven computer mouse 100. The first finger-driven computer mouse 100 may include the insert 140 that may be a sponge material or a foam plastic material or the like. The insert 140 may have a shape that corresponds to an inner portion 130 of the mouse housing extension 120 leaving the fingertip trench 150 exposed. Furthermore, to accommodate various different finger sizes, the insert 140 may be removable and exchangeable to complement the different fingertip sizes. Additionally, the insert could be made available in various degrees of firmness depending on user preferences.

In operation, the finger-driven computer mouse 100 is held securely on a flat surface with the user inserting several fingertips into the fingertip trench 150. The computer mouse 100 may accommodate the user's index finger, middle finger and ring finger. With the fingertips in the fingertip trench 150, a slight pressure mainly from the natural weight of the index finger, middle finger and ring finger and the palm of user's hand are applied on the computer mouse 100. Meanwhile, the index finger and middle finger may generate a slight lateral pressure. The pressure on the bottom of the fingertip trench 150, and on the side of the insert 140, along with the frictions generated, hold the computer mouse 100 stable on the flat surface which the computer mouse is stationed on. The pinky, the thumb and the palm of the hand all rest on the flat surface. Advantageously, all of the fingers are curled naturally with the distal and intermediate phalanges of the index finger, middle finger, ring finger and pinky finger curled toward the palm and nearly vertical to the horizontal flat bottom surface of the mouse 100. The thumb is bent naturally toward the fingers. The above posture favors the hand being in a natural, relaxed loose fist shape. All the fingers, the thumb, the palm and the wrist of the hand rest on a solid surface and none of the mouse buttons 172, 174 and scroll wheel 160 will be inadvertently touched When the computer mouse 100 is held in this natural, relaxed loose fist shape, the muscles of the fingers, the thumb, the palm heel and the wrist are relaxed. The joints of the fingers, the thumb, the wrist and the forearm are aligned without any biased twist applied. To manipulate the computer mouse 100, with slight downward pressure from the fingertips, the mouse may be moved forward by stretching out the fingers and moving the fingertips away from the palm, moved backward by curling the fingers further and moving the fingertips closer to the palm without moving any other body part. The above stretching and curling the fingers are the most easy and natural movements. Indeed, it is more similar to relaxation than stress. Lateral movement of the computer mouse 100 may be realized by a gentle swing of the wrist with the forearm moving slightly to the left or to the right, respectively. The distance from the wrist to the fingertips is longer than the distances from the wrist to the thumb tip or center of the palm. Accordingly, swinging the computer mouse 100 requires less movement of the wrist and forearm than conventional mice which are held between the thumb and fingers or in the palm. Less movement for the wrist and the forearm means less stress, fatigue and injury.

Figure 4:
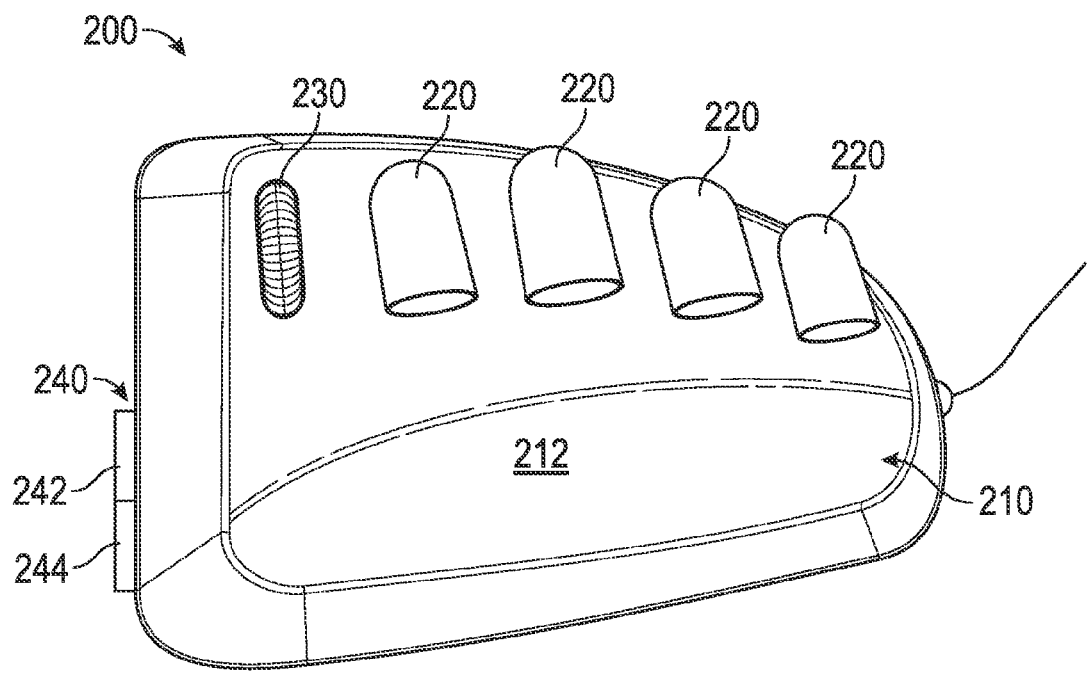
FIG. 4 illustrates a top view of a finger-driven computer mouse, according to a second embodiment.

FIG. 4 illustrates a top view of a finger-driven computer mouse 200, according to a second embodiment. The finger-driven computer mouse 200 is similar to the finger-driven computer mouse 100, the main difference being that the housing 210 includes a plurality of fingertip tubes 220. As with the first computer mouse 100, the housing 210 may contain a plurality of computer mouse components 212. The finger tubes 220 may be made available in various sizes to accommodate different sized fingers. The fingertip tubes 220 may be disposed on top of the computer mouse housing 210, as shown. The finger tubes 220 conform to the fingertips and receive each of a plurality of the user's fingers (not shown). The finger-driven computer mouse 200 may include a scroll wheel 230 that may be disposed adjacent to the finger tubes 220. The finger-driven computer mouse 200 may include a plurality of mouse buttons 240 that may be disposed on a second side of the computer mouse housing 210 (as in the first embodiment). The mouse buttons 240 may include a left click mouse button 242 and a right click mouse button 244 or the like. The mouse buttons 240 may be operated by a user's thumb (not shown). The finger-driven computer mouse 200 may be made of plastic, metal or the like.

Figure 5:
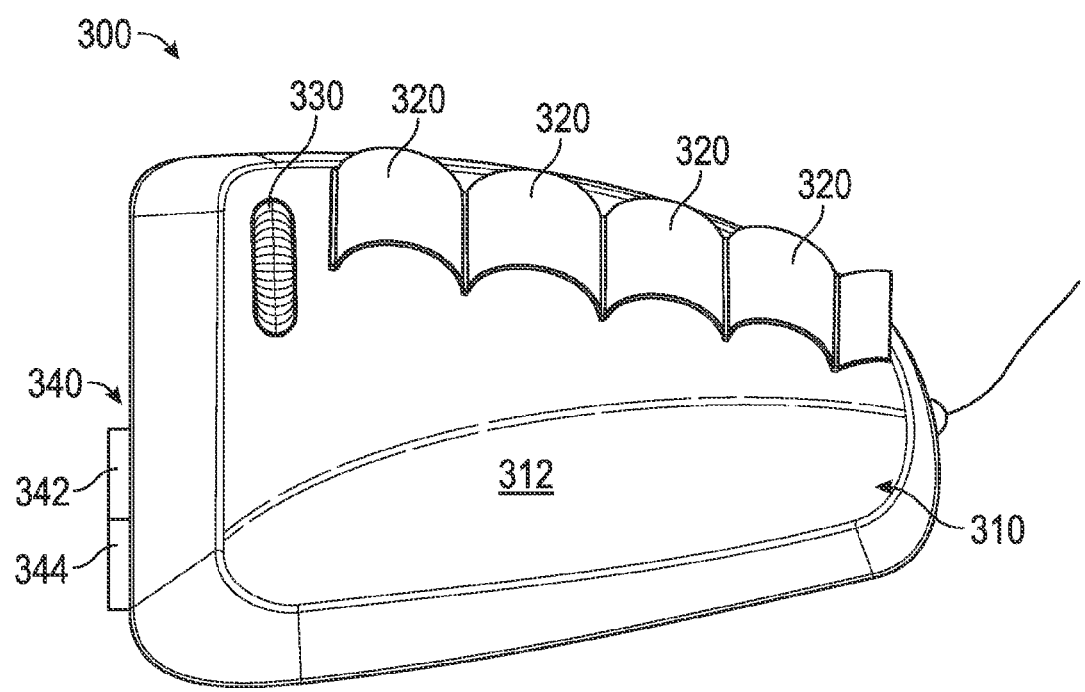
FIG. 5 illustrates a top view of a finger-driven computer mouse, according to a third embodiment.

FIG. 5 illustrates a top view of a finger-driven computer mouse 300, according to a third embodiment. The finger-driven computer mouse 300 is similar to the finger-driven computer mouse 100, the main difference being that the housing 310 includes a plurality of fingertip straps 320. As with the previously described embodiments, the finger-driven computer mouse 300 may include a computer mouse housing 310 enclosing suitable components 312 depending on the desired type of mouse. The fingertip straps 320 may be disposed on top of the computer mouse housing 310 and receive each of a plurality of a user's fingers (not shown). The fingertip straps 320 may be adjustable so as to accommodate different finger sizes. The finger-driven computer mouse 300 may include a scroll wheel 330 that may be disposed adjacent to the finger tubes 320. The finger-driven computer mouse 300 may include a plurality of mouse buttons 340 that may be disposed on a second side of the computer mouse housing 310. The mouse buttons 340 may include a left click mouse button 342 and a right click mouse button 344 or the like. The mouse buttons 340 may be operated by the user's thumb. The finger-driven computer mouse 340 may be made of plastic, metal or the like.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A finger-driven computer mouse comprising:
a computer mouse housing; and
a finger-driving impact receiving device disposed parallel and adjacent to a lateral side of the computer mouse housing, the finger-driving impact receiving device being a rectilinear-walled structure comprising at least four rectilinear sidewalls and forming a trench, wherein the at least four rectilinear sidewalls define a perimeter, and wherein the trench frictionally holds a plurality of fingertips of a user.

2. The finger-driven computer mouse of claim 1, wherein the computer mouse housing further comprises a scroll wheel and two buttons disposed asymmetrically adjacent to one end of the computer mouse housing, wherein the scroll wheel is disposed between the finger driving impact receiving device and the two buttons.

3. The finger-driven computer mouse of claim 1, further comprising a plurality of exchangeable drop-ins, wherein the plurality of exchangeable drop-ins are received by the trench and bound within the perimeter.

4. The finger-driven computer mouse of claim 3, wherein inner spaces of the plurality of exchangeable drop-ins have several different structures to fit various finger sizes.

5. The finger-driven computer mouse of claim 3, wherein the plurality of exchangeable drop-ins are foam material.

\* \* \* \* \*